United States Patent
Salameh

(10) Patent No.: US 6,227,783 B1
(45) Date of Patent: May 8, 2001

(54) FASTENER WITH RETAINING SLEEVE

(75) Inventor: Ralf Salameh, Bretten (DE)

(73) Assignee: Federal-Mogul Sealing Systems Bretten GmbH & Co., KG, Bretten (DE)

(*) Notice: Subject to any disclaimer, the term of this patent is extended or adjusted under 35 U.S.C. 154(b) by 0 days.

(21) Appl. No.: 09/556,125

(22) Filed: Apr. 20, 2000

(30) Foreign Application Priority Data

Mar. 11, 2000 (DE) .............................................. 100 11 919

(51) Int. Cl.$^7$ .............................. F16B 21/18; F16B 39/00
(52) U.S. Cl. ........................ 411/353; 411/107; 411/533; 411/999
(58) Field of Search .................................... 411/352, 353, 411/107, 533, 999, 969

(56) References Cited

U.S. PATENT DOCUMENTS

| | | | |
|---|---|---|---|
| 2,922,456 | * 1/1960 | Kann | 411/999 X |
| 3,018,512 | * 1/1962 | Dobroaielski et al. | 411/999 X |
| 3,829,696 | * 4/1958 | Wagner | 411/999 X |
| 5,338,139 | * 8/1994 | Swanstrom | 411/353 |
| 5,511,301 | * 4/1996 | McQuire | 411/533 X |
| 6,044,536 | * 4/2000 | Schneider | 411/353 X |

* cited by examiner

Primary Examiner—Neill Wilson
(74) Attorney, Agent, or Firm—Klaus J. Bach

(57) ABSTRACT

In a fastener comprising a screw with a shaft having a thread portion at one end and a head at the other end and an axially extending sleeve structure provided with an internal thread at its end adjacent the screw head in which the screw is captured wherein the screw shaft has a reduced diameter area between the screw head and the screw thread, which is disposed within the sleeve thread area after the screw has been threaded through the sleeve thread, the adjacent end areas of the sleeve thread and the screw thread are made inoperative by cold deformation so that the screw is captured in the sleeve structure.

4 Claims, 1 Drawing Sheet

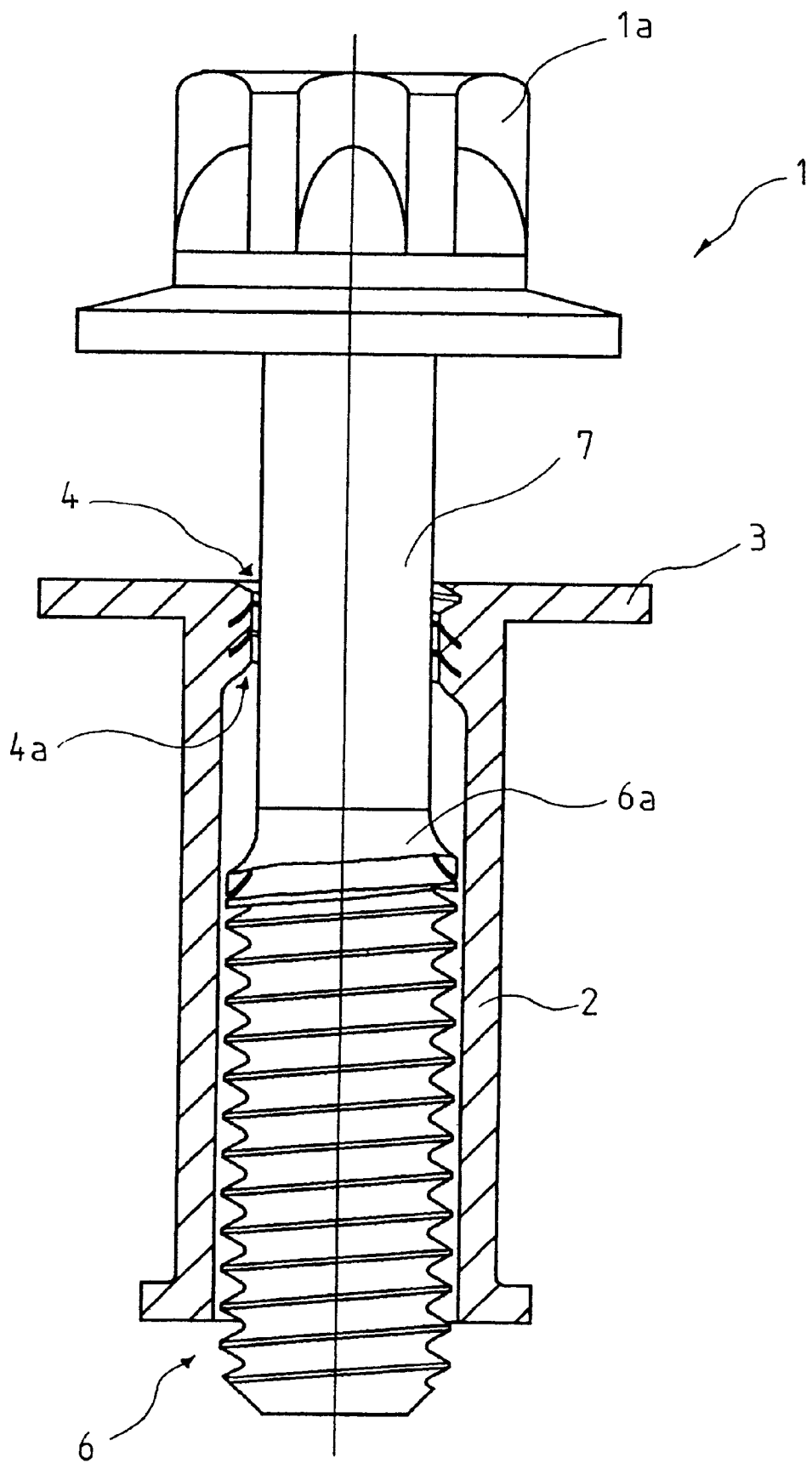

FASTENER WITH RETAINING SLEEVE

BACKGROUND OF THE INVENTION

The invention relates to a fastener comprising a screw having a shaft with a thread and a head of an increased diameter. The screw is permanently retained in an axial sleeve. The screw shaft has a reduced diameter at its end adjacent the head and the sleeve is threaded at its end adjacent the screw head the thread being disabled by cold deformation after the screw has been inserted.

Such a fastener is known for example from DE 197 50 658 C1. In this known fastener, the screw is captured in the sleeve by at least one inoperative thread pitch. The inoperative thread pitch is disposed at the end of the sleeve thread adjacent the screw head. The inoperativeness of the thread is achieved by a radial projection on the shaft of the screw adjacent the screw head. Upon tightening of the screw, the radial projection is pulled into the thread of the sleeve whereby the thread pitches adjacent the screw head are subjected to cold deformation such that they become inoperative.

Although with this known arrangement the screw is reliably and relatively simply captured in the sleeve, the fastener has the disadvantage that conventional screws can not be used. It requires special screws which are provided with radial projections on the shaft adjacent the screw head.

It is the object of the present invention to provide a fastener of the type referred to above wherein the screw is captured in a simple manner.

SUMMARY OF THE INVENTION

In a fastener comprising a screw with a shaft having a thread portion at one end and a head at the other end and an axially extending sleeve provided, at its end adjacent the screw head, with an internal thread in which the screw is captured wherein the screw shaft has a reduced diameter area between the screw head and the screw thread, which is disposed within the sleeve thread area after the screw has been threaded through the sleeve thread, the adjacent end areas of the sleeve thread and the screw thread are made inoperative by cold deformation so that the screw is captured in the sleeve.

Since the inoperative areas of the thread of the sleeve are at the end of the sleeve thread remote from the screw head or the inoperative end of the thread of the screw is at the thread end of the screw adjacent the screw head, the cold deformation of the thread areas can be achieved in a very simple manner. The thread pitches may be made inoperative simply by pressing the threaded portion of the screw axially against the threaded portion of the sleeve as it is provided for in a particular embodiment of the invention.

With this arrangement at least one inoperative thread pitch of the sleeve is disposed remote from the screw head or, respectively, the inoperative thread pitch of the screw is disposed at the end of the screw thread adjacent the screw head. This has the advantage that the screw cannot thread itself into the thread of the sleeve unintentionally during transport. If the screw would thread itself even slightly into the sleeve thread, the screw would not fully project from the sleeve when the fastener is mounted. The screw would then not fully engage the element into which it is to be screwed.

The screw thread can be pressed against the thread of the sleeve by moving the screw toward the sleeve thread by a predetermined distance. In this way, the amount of the cold deformation can be accurately adjusted. The cold deformation of the thread areas however can be achieved also by pressing the screw toward the thread of the sleeve with a predetermined force. This is advantageous in that the force applied to the screw and the sleeve is easily controlled such that an excessively high force will not be applied to the screw or the sleeve thereby avoiding damage to the screw or the sleeve.

It is further possible to achieve the cold deformation of the screw and the sleeve by applying a predetermined impulse to the screw in the direction toward the thread of the sleeve. In this way, the cold deformation of the screw and the sleeve threads is achieved in a rapid and simple manner.

Other features and details of the present invention will become apparent from the following description thereof with reference to the accompanying drawings.

BRIEF DESCRIPTION OF THE DRAWINGS

The sole FIGURE shows the fastener according to the invention.

DESCRIPTION OF A PREFERRED EMBODIMENT

As shown in the FIGURE, the fastener comprises a screw 1 and a cylinder-like sleeve 2. The screw 1 has a screw head 1a of increased diameter and a thread 6. Below the screw head 1a the screw has a shaft portion 7 of reduced diameter which is not provided with a thread.

The sleeve 2 has a flange 3 at its end adjacent the screw head 1a. At its end adjacent the screw head 1a, the sleeve 2 is further provided with an internal thread 4, which corresponds to the thread 6 on the screw and by way of which the screw 1 has been threaded into the sleeve 2.

At its end remote from the screw head 1a, the pitches of the thread 4 of the sleeve have an inoperative area 4a. Also, the pitches of the thread 6 on the screw 1 have an inoperative area 6a at the end of the screw thread adjacent the screw head 1a. The inoperability of the thread pitches was achieved by pressing the screw 1 with its thread 6 axially against the thread 4 of the sleeve 2.

With the inoperability of the areas 4a, 6a, the screw 1 can no longer be screwed out of the sleeve 2. It is therefore captured in the sleeve 2.

The fastener is manufactured by first screwing the screw 1 into the sleeve 2. The screw is screwed fully through the thread 4 of the sleeve 2 so that the shaft 7 of the screw 1 is disposed within the thread 4 of the sleeve 2. In this position, the screw 1 is axially movable with respect to the sleeve 2.

By applying a predetermined axial force or an axial impulse in the direction toward the screw head, the screw 1 is pressed with its thread 6 against the thread 4 of the sleeve 2. In this way, cold deformation of the respective adjacent end areas 4a, 6a of the threads 4, 6 is achieved which thereby become inoperative.

What is claimed is:

1. A fastener comprising a screw with a shaft having a thread portion at one end of the shaft and an increased diameter head at the opposite end of the shaft, and an axially extending sleeve structure in which said screw is disposed, said screw shaft having an area of reduced diameter between said thread portion thereof and said screw head, and said sleeve structure having at least at its end adjacent said screw head an internal thread which originally corresponds to the thread on said screw and through which said screw has been screwed into said sleeve structure, said screw shaft portion between said thread portion thereof and said screw head being thread-free such that said screw is freely movable axially in said sleeve thread over the reduced diameter area of said screw, at least one of the adjacent end areas of said sleeve thread and said screw thread being made inoperative by cold deformation after said screw portion has been threaded through said internal thread of said sleeve so that said screw is captured in said sleeve.

2. A fastener according to claim 1, wherein the adjacent thread pitches of said screw thread and said sleeve thread were made inoperative by axially pressing the screw thread against the sleeve thread with a predetermined force.

3. A fastener according to claim 2, wherein, for cold deformation of said thread ends, said screw threads are moved axially into engagement with each other by a predetermined distance.

4. A fastener according to claim 2, wherein, for cold deformation of said thread ends, a predetermined impulse is applied to said screw in the direction toward said screw head.

* * * * *